(12) United States Patent
Yavitz

(10) Patent No.: US 6,463,469 B1
(45) Date of Patent: Oct. 8, 2002

(54) COMPUTER-BASED RDS/MBS RECEIVER SYSTEM FOR USE WITH RADIO BROADCAST SIGNAL

(76) Inventor: Edward Q. Yavitz, 3828 Spring Creek Rd., Rockford, IL (US) 61114

( * ) Notice: Subject to any disclaimer, the term of this patent is extended or adjusted under 35 U.S.C. 154(b) by 0 days.

(21) Appl. No.: 09/484,334

(22) Filed: Jan. 18, 2000

(51) Int. Cl.[7] ............................................. G06F 15/16
(52) U.S. Cl. ....................................... 709/219; 455/557
(58) Field of Search ........................... 709/219; 455/557

(56) References Cited

U.S. PATENT DOCUMENTS

| | | | |
|---|---|---|---|
| 5,790,958 A | 8/1998 | McCoy et al. | 455/557 |
| 6,021,433 A | 2/2000 | Payne et al. | 709/219 |
| 6,161,002 A | * 12/2000 | Migliaccio et al. | |

* cited by examiner

Primary Examiner—John A. Follansbee
(74) Attorney, Agent, or Firm—Fletcher, Yoder & Van Someren

(57) ABSTRACT

A radio reception system is combined with a computer system. The radio reception system includes a radio receiver that is integrated with a personal computer system. The radio receiver is configured to receive analog FM signals and linked data transmitted according to at least one of the RDS and MBS standards. The data serves as a data trigger to provide the user with a prompt on the computer system. The prompt may be utilized to access information related to the primary radio broadcast and previously stored at a memory location, such as a computer disk drive, CD or floppy disk. This permits a user to quickly and easily access large amounts of information relevant to the current programming of a given radio station or to purchase music, goods and services as they are featured in the FM broadcast.

7 Claims, 5 Drawing Sheets

COMPUTER-BASED RDS/MBS RECEIVER SYSTEM FOR USE WITH RADIO BROADCAST SIGNAL

FIELD OF THE INVENTION

The present invention relates generally to a system that provides a user with additional information related to the subject matter broadcast via a radio broadcast, e.g. an FM radio broadcast, and particularly to the utilization of at least one of the RDS and MBS standard signals as a data trigger to provide a listener with additional information related to the programming being broadcast.

BACKGROUND OF THE INVENTION

Radio broadcasts, such as FM radio broadcasts, have long been used for the broadcast of information, such as music and commentary. Traditionally, the FM broadcast signal has been received on a receiver, such as a radio or stereo, that converts the broadcast signal to audible information. With the expansion of the Internet and the accompanying dissemination and availability of information, radio broadcasters have been seeking methods to convey additional information related to the primary programming.

Proposals have been formed for providing radio content, including voice and music, over the Internet. However, bandwidth in the current infrastructure is largely inadequate for the high quality transfer of data that can be audibly played at, for example, an individual's personal computer. Others have attempted to transfer digital data via the RDS and/or MBS standards. However, only a limited amount of data can be transferred in this manner, e.g. less than 1KB per minute, and radio stations, as well as end users, have been slow to utilize RDS and MBS capability.

The RDS and MBS standards can be used to encode and decode digital data on an FM multiplexed signal for transmission and reception along with the primary FM broadcast signal. Both RDS (radio data system) and MBS are encompassed within the RBDS standard. The RDBS or Radio Broadcast Data System standard was developed for encoding digital data to allow transmission of the digital data on an FM carrier propagated over the airwaves. Radio stations, for instance, use the RBDS standard to transmit limited digital data, such as station call letters or music type, to receivers of a corresponding FM signal. The RBDS standard encompasses both RDS and MBS.

It would be advantageous to utilize the limited data transfer capabilities according to the RDS and/or MBS standards in a manner that permitted recipients to gain access to a variety of substantial information related in real time to the programming on the corresponding primary FM carrier without requiring the recipient to be on the Internet.

SUMMARY OF THE INVENTION

The present invention features a radio reception system. The system comprises a personal computer having a processor, a display and a memory for storing information related to the content of an FM radio broadcast. The system further includes a radio receiver configured to receive a corresponding data transmitted according to at least one of the RDS and MBS standards. The radio receiver is operatively coupled to the computer system. The corresponding data provides a trigger that allows an individual to automatically access information stored in the memory that is related to the specific content being broadcast at a given time.

According to another aspect of the invention, a method is described for providing information related to an FM radio broadcast. The method includes utilizing a computer system having a processor to receive a data trigger transmitted under at least one of the RDS and MBS standards. The method further includes storing data related to the FM radio broadcast at a location accessible to the processor. Additionally, the method includes accessing a select data from the stored data according to the data trigger being transmitted at a given time.

According to further aspects of the present invention, a radio reception system is provided. The system includes an interactive computer based system that may be coupled to the Internet for transfer and receipt of information over the Internet. The system also includes a radio receiver operatively coupled to the interactive computer based system. The radio receiver is capable of receiving a data trigger related to programming broadcast by an FM radio station. Additionally, the system includes a data storage location accessible to the interactive computer based system. The data trigger provides a user direct access to information stored at the data storage location that is related to the FM radio broadcast programming.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

The following description is of a computer-based system, typically utilizing a personal computer, that allows a user to readily access information related to the music or other programming broadcast by a radio station. As personal computers and home entertainment systems advance, there may be integration of personal computing systems with television and/or radio. The systems described below can be adapted to and envision such changes.

One exemplary existing system that can be used in conjunction with the inventive system described below is a combined radio and personal computer as described in McCoy et al., U.S. Pat. No. 5,790,958, issued Aug. 4, 1998 and entitled Radio Reception System For General Purpose Computer. The McCoy et al. patent, U.S. Pat. No. 5,790,958, is incorporated herein by reference. The McCoy et al. patent describes a design for a radio receiver card that may be plugged into a personal computer to permit a user to receive and play radio broadcasts on his or her computer. The McCoy et al. system also receives and decodes RDS and/or MBS data transmissions in the FM stereo tuner mode and is able to display the RDS and/or MBS data on the monitor of the computer. However, the McCoy et al. patent does not disclose how to utilize the relatively small amounts of RDS and/or MBS digital data as a trigger to obtaining relatively large amounts of data related to the programming being played on a given radio station at a given time.

Figure 1:
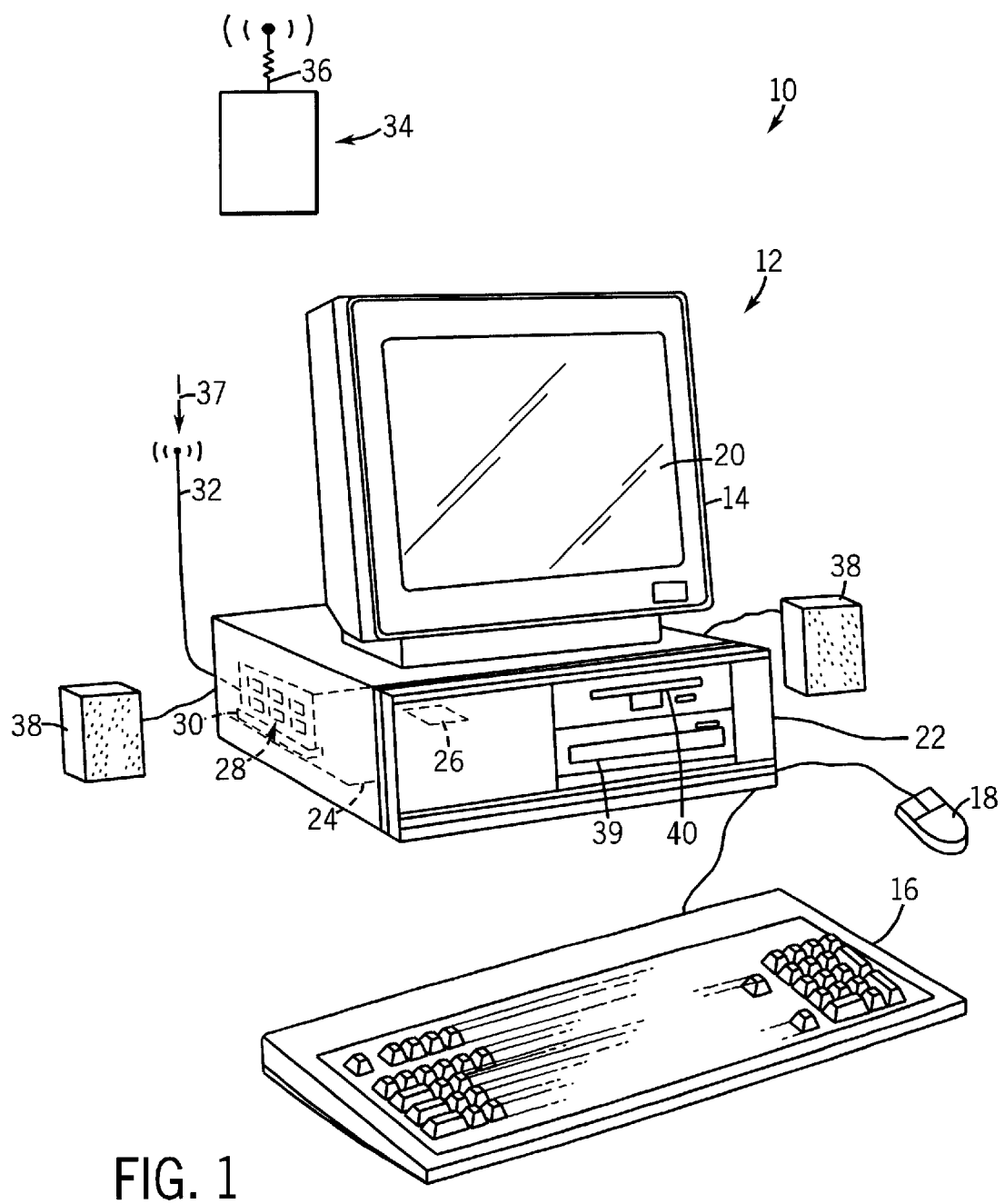
FIG. 1 is a perspective view of an exemplary personal computer system having a receiver for receiving data via FM signal radio waves.

Referring generally to FIG. 1, a radio reception system 10 is illustrated according to an exemplary embodiment of the present invention. In this exemplary embodiment, system 10 includes a personal computer 12 having a user interface that may include a monitor 14, a keyboard 16 and a mouse 18. Monitor 14 may have a variety of forms, including CRT or flat screen displays. However, monitor 14 typically includes a display screen 20 for displaying a variety of information to the user.

Personal computer system 12 also includes a housing 22 containing a motherboard 24 upon which a variety of computer circuit components, including a processor 26, are mounted. Additionally, a radio data reception system 28 is coupled to the motherboard 24. Radio data reception system 28 includes, for example, an FM tuner and digital data decoder card 30 that is connected to motherboard 24, as shown. Card 30 may be a printed circuit board style card configured for pluggable engagement with personal computer 12 at, for example, a PCI slot. Radio data reception system 28 also includes a reception antenna 32 that is attached to FM tuner and digital data decoder card 30 to receive FM signals transmitted over the airwaves from a radio broadcast station 34 having a broadcast antenna 36.

In the exemplary embodiment illustrated, FM radio signals are processed by the computer 12 for playback of audio signals through one or more speakers 38 attached to computer 12. Computer 12 also processes any RDS and/or MBS digital data received from the FM transmission. This RDS/MBS data contains a digital or data trigger 37 that provides a prompt on display screen 20 to a user and permits the user to automatically obtain additional information about the music or other programming being broadcast on the primary FM radio signal via radio station 34. The additional information which has been stored prior to the broadcast, for example, can be liner notes to the music containing information related to the musician or musicians responsible for the music being played, additional information about upcoming concerts, weblinks to the musicians or to Internet CD vendors whereby the listener can order the music as it is heard with a single click of the mouse. Other prompts that may appear on screen include information related to an advertisement or products/services advertised, information about commentators or disc jockeys providing commentary, etc. The programming code included with the previously downloaded material allows the listener to establish accounts with advertisers or CD vendors in order to make split second purchasing decisions when prompted by the music or advertised offers. The radio reception system 10 permits the user to obtain this information automatically as the programming takes place.

It should be noted that the exemplary personal computer 12 also includes a CD drive 39 and a floppy disk drive 40. CD drive 39 and disk drive 40 provide potential locations for storage of data, via CD or floppy disk, or for the downloading of data related to the programming of a given radio station 34, as explained in more detail below.

Figure 2:
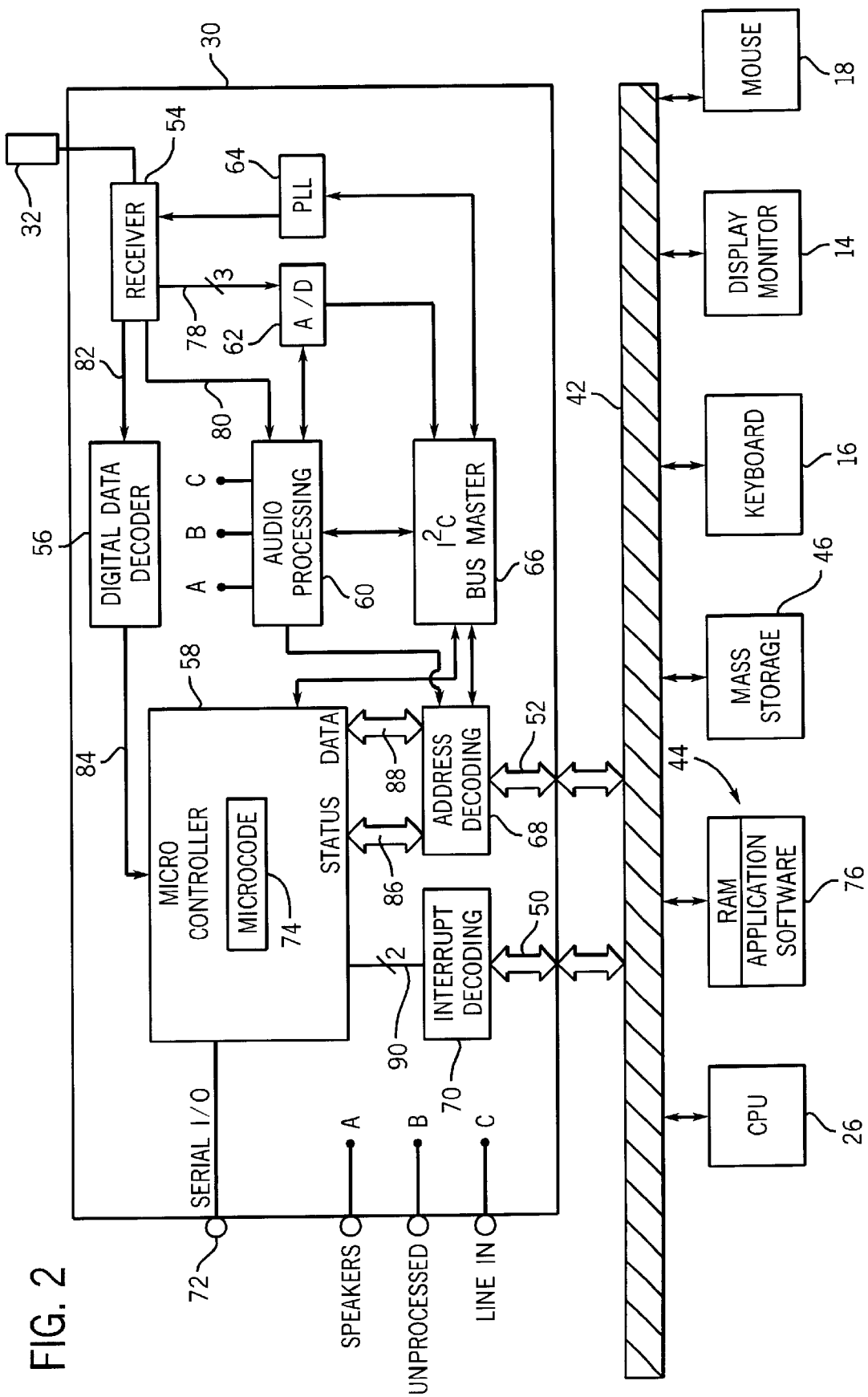
FIG. 2 is a schematic diagram depicting components of an exemplary receiver system for use in a personal computer.

An exemplary implementation of radio data reception system 28 and as described in U.S. Pat. No. 5,790,958 is discussed with reference to FIG. 2. In this exemplary embodiment, FM tuner and processing card 30 is connected via a bus 42, such as an ISA bus, to the components of a personal computer. The main personal computer components include a central processing unit (CPU), such as processor 26. Additionally, personal computer 12 includes a RAM memory unit 44, a mass storage unit 46, keyboard 16, display monitor 14 and mouse 18. It should be noted that it is possible to externally mount card 30 outside of personal computer 12 and connect the processing card to the computer via an external interface. Processing card 30 interfaces with bus 42 through a group of interrupt lines 50 and a group of address and data lines 52. Card 30 comprises a receiver and tuner unit 54 which is connected to antenna 32. Receiver 54 is connected to a digital data decoder 56 which, in turn, is connected to a digital data processor or microcontroller 58. The receiver 54 also is connected to an audio processing unit 60, an analog to digital converter 62 and a phased loop logic (PLL) circuit 64. A local bus controller 66, such as an I²C bus master, is connected to the devices 58, 60, 62 and 64 as shown, and is also connected to address decoding circuitry 68. The address decoding circuitry 68 and an interrupt decoding circuitry 70 are both connected to the microcontroller 58.

Processing card 30 also contains an external serial port 72 connected to microcontroller 58. Card 30 also includes three audio ports labeled A, B and C, connected to the audio processing unit 60. Audio port A is an audio output port for connection to external speakers. Audio port B is an unprocessed audio port for connection to a sound card or other audio device. Audio port C is an input port or "line-in" port for receiving audio signals to be processed by the audio processing unit 60.

In operation, processing card 30 performs stand-alone functions dictated by software or microcode 74, which is resident within the microcontroller 58. Microcontroller 58 may be a standard 8051 device operating a 12 MHz. Additional functions of the processing card 30, as well as processing functions of the radio data reception system, are controlled by an application software 76 resident in the associated personal computer 12 and which may be stored in the mass storage device 46 and loaded into the computer's memory unit 44 during operation. By sharing processing functions between the card microcontroller 58 and the computer processor 26, performance of the overall system can be enhanced and optimized to take advantage of the more powerful host CPU.

Communication between the various devices of processing card 40 may be accomplished via a local 2-bit I²C bus. In the exemplary embodiment, local bus access is controlled through the I²C bus master chip 66. It should be noted that it is also possible to configure the microcontroller 58 as the bus master, thereby eliminating the need for separate bus master chip 66.

Tuning information received from the application software 76, via bus 42, is routed through the I²C bus master 66 and to the PLL 64. Similarly, audio processing parameters are routed to the audio processing unit 60 via the bus master 66. The receiver 54 locks onto the desired FM station and emits corresponding signals along paths 78, 80 and 82.

Along the data path 78, three separate signals are transmitted indicating the strength of the detected audio signal and the levels of the left and right stereo signals. This information is then digitized by the A/D converter 62 and then transferred back through bus 42 for processing and display by the application software 76. The signal containing the analog audio information is transmitted along the path 80 for further processing by the circuitry 60 before being output to the audio port A. The audio signal also is transmitted along path 82 to the digital data decoder 56. The digital data decoder 56 demodulates and decodes the digital RBDS data (either RDS or MBS) associated with the particular FM station which is tuned by receivers 54.

The digital data decoder 56 may be any number of standard decoding devices. In an exemplary embodiment, a Phillips brand model SA6574T is used. The digital data decoder 56 outputs a continuous digital data stream, and corresponding clock signal, along a path 84 for reception by microcontroller 58 for analysis and processing.

The microprocessor performs a sequence of operations to identify, decode, store and eventually transmit the RDS and/or MBS data along but 42 to the host personal computer. In the exemplary embodiment, if microcontroller 58 detects RDS data, it automatically decodes the RDS data. Similarly, if the microcontroller 58 detects MBS data, it automatically decodes the data.

Communication between microcontroller and the host personal computer, or other display/processing system is accomplished via a status port having corresponding signal lines and a data port having a corresponding signal line 88. Depending on the particular microcontroller, the data and status ports may be on-board or implemented with an external I/O device. In the exemplary embodiment, the data and status ports are 8-bit registers and the signal lines 86, 88 each contain corresponding eight individual signal paths. The status signal lines 86 serve to identify the current transfer operation performed by the microcontroller 58, and the data signal lines 88 transfer the data from the microcontroller 58 to the host computer. The data and status information from the corresponding ports is decoded by the address decode circuitry 68 and presented to the bus 42 for transfer to the host computer.

Interrupt decoding information is transferred from the microcontroller 58 to the interrupt decoding circuitry 70 along a path 90. When the microcontroller 58 wishes to interrupt the host computer, interrupt signals are processed by the decoding circuitry 70 and presented to the bus 42 over the signal lines 50. Data transfer between the microcontroller 58 and the host computer can be accomplished by an "interrupt" method or a strict "polling" method, as discussed in U.S. Pat. No. 5,790,958. Additionally, because processing card 30 may be exposed to the surrounding circuitry of the host computer, RF shielding of the card or individual components may be required to avoid interference with the audio information processed by card 30.

One of the problems with systems or methodology for utilizing RDS and/or MBS is the relatively limited amount of data that can be carried by the RDS and/or MBS signal. Thus, only small amounts of information related to the radio programming can be transferred by such mechanisms. Accordingly, the present invention embodied in radio reception system 10 utilizes the RDS and/or MBS signal as a data trigger 37 for obtaining additional information stored at a location M (see FIG. 3) accessible to personal computer 12. Three exemplary storage locations M include a CD 92 or floppy disk 94 utilized in conjunction with CD drive 39 or disk drive 40, respectively; mass storage 46, such as a personal computer hard drive; and a memory module 96 mounted on processing card 30 and accessible to microcontroller 58 via line 98. The information can also be downloaded over a network, e.g. the Internet, to a storage location M, such as a computer hard drive. Potentially, storage location M can be at a remote network location, such as on a server 91, as illustrated in FIG. 4.

According to one exemplary methodology, a CD 92 or a floppy disk 94 is supplied to a radio station's listeners. The CD 92 and/or floppy disk 94 typically contains information related to the radio station programming. For example, there may be substantial information related to the music and musicians played by the radio station during a given time period. Additionally, there may be data related to the station's advertisers including information relating to products, services and the ordering of such products and services.

When the user receives disk 92 or 94, he or she simply inserts it into CD drive 39 or disk drive 40 and downloads the information to the disk drive of the computer, i.e. mass storage 46. (As mentioned above, the overall system can be designed to store the subject information in a variety of locations.) Depending on the specific location, the data trigger 37 carried on the RDS or MBS signal is designed to facilitate location of relevant data from the stored information for viewing by the user. It should be noted that the relevant information can also be downloaded over the Internet from, for example, a radio station website.

As described more fully below, when the RDS or MBS signal is received, the user is provided with a prompt at display screen 20. Upon clicking the prompt by, for example, mouse 18 the stored information is accessed in storage location M, e.g. mass storage 46. Preferably, the data trigger 37 provided by the RDS/MBS signal is addressed to correspond to the storage location of particular information related to the actual programming being broadcast at that time. Thus, if the individual is listening to a song of particular interest on the radio data reception system 28, the data trigger can be used, via the prompt on display screen 20, to access information related to the specific song or group performing the song. For example, musical selections played by a given radio station may be cataloged according to their CDDB unique identification numbers, and the data trigger can contain corresponding identification data to locate the specific relevant information from storage location M. The format and utilization of a data trigger on the RDS/MBS signal depends on the overall design of radio reception system 10 and the preferred storage location for the information, but it is within the skill of one of ordinary skill in the art.

It should be noted that receiver 54 typically is designed to receive radio signals, e.g. FM radio signals, transmitted from one radio station or a limited number of radio stations within a related group. This allows the particular radio station or stations to provide information related to their specific programming for access by an individual listening to the station's programming.

Figure 3:
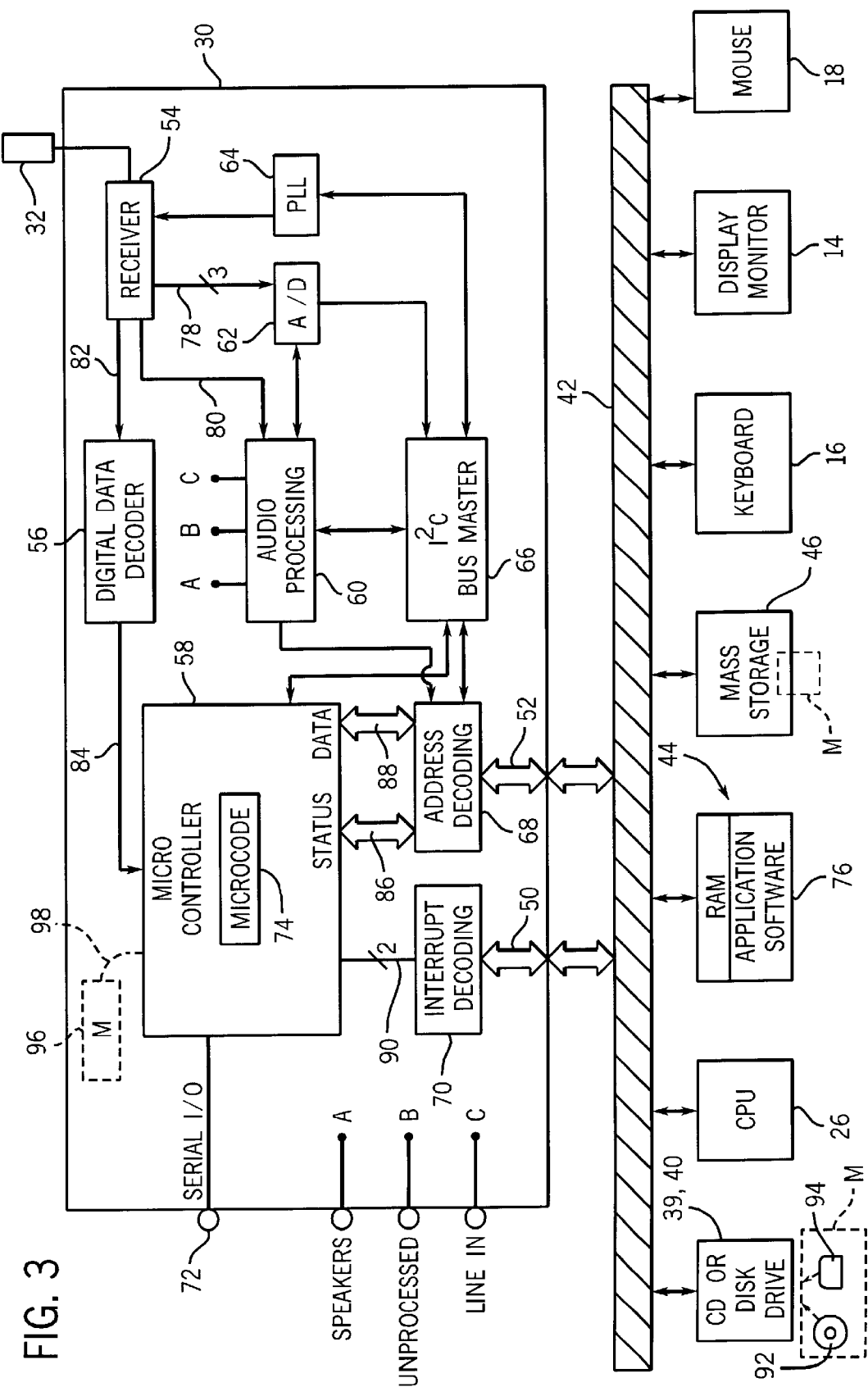
FIG. 3 is a schematic diagram similar to that of FIG. 2 but showing various memory locations for storing data related to a particular FM radio broadcast.
Figure 4:
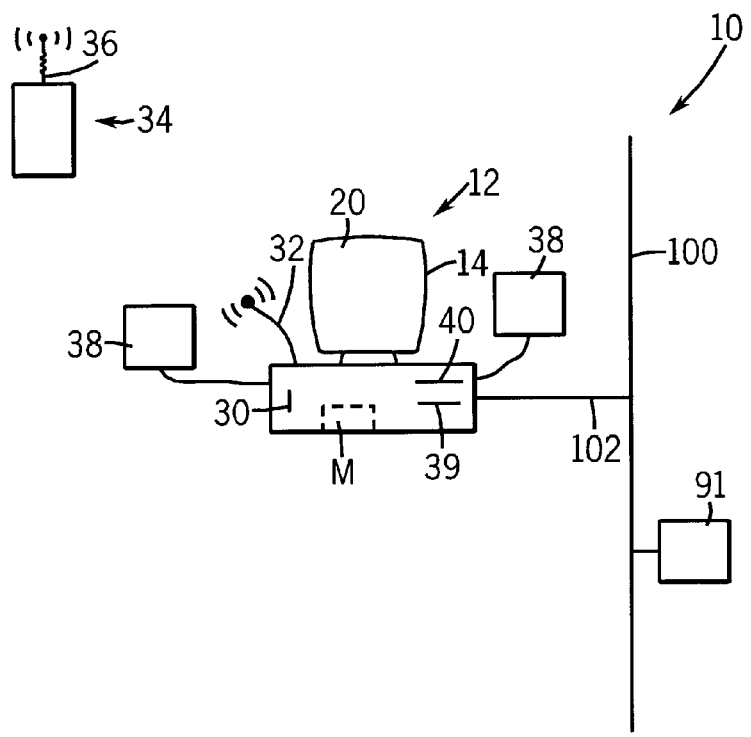
FIG. 4 is a schematic diagram representing one exemplary topology for the overall system described herein.

Another advantage of the system described with reference to FIG. 3 is the ability of the system to provide a user with current information related to the FM programming to which he or she is listening, while simultaneously permitting access to unrelated information over a network 100, such as the Internet (see FIG. 4). In the topology illustrated in FIG. 4, a combined personal computer system 12 and radio data reception system 28 is provided for receiving a primary FM radio broadcast signal as well as an RDS/MBS signal from radio station 34. Simultaneously, personal computer 12 is coupled to network 100, e.g. the Internet, via an appropriate modem and connection 102. Thus, an individual can simultaneously utilize personal computer 12, listen to an FM radio broadcast from radio station 34, obtain and send information over network 100, and access relatively large amounts of data from memory location M that is related to the programming being broadcast at that given time.

Figure 5:
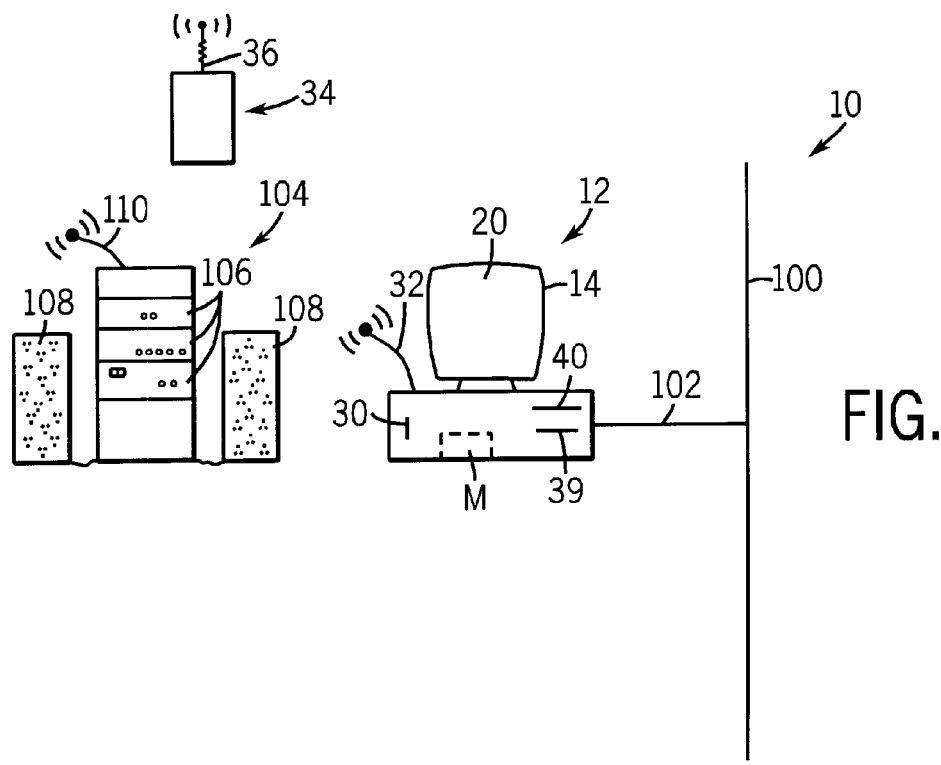
FIG. 5 is a schematic diagram similar to that of FIG. 4 but showing an alternate, exemplary topology.

Even though the system illustrated in FIG. 4 is an exemplary system, the overall system 10 can have a variety of designs and topologies. As illustrated in FIG. 5, for example, personal computer 12 can be utilized in conjunction with a separate radio receiver system 104. In this particular topology, card 30 and receiver 54 may be designed to receive only the RDS/MBS signal related to the programming being broadcast over the primary FM radio signal to radio receiver system 104. This topology permits use of a wide variety of stereos and other radio reception systems that may be more amenable to an individual's preferences in stereo components 106 and audio speakers 108. In this embodiment, the primary FM radio signal is received by an antenna 110 of radio receiver system 104, and the RDS/MBS signal is received by antenna 32 attached to card 30. Even though the FM programming is played on a separate system, the simultaneously broadcast RDS/MBS signal received by card 30 permits simultaneous access to additional information stored at memory location M, and related to the primary programming.

Figure 6:
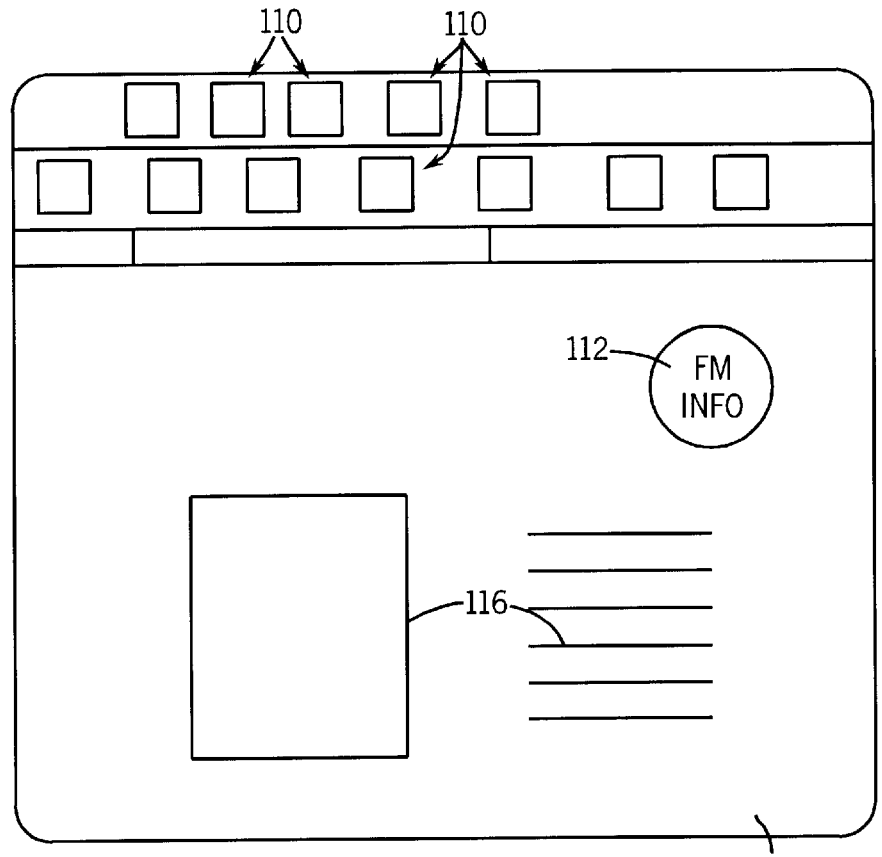
FIG. 6 is a diagram of a graphical user interface that permits a user to simultaneously utilize a personal computer and obtain information related to a current FM radio broadcast.
Figure 7:
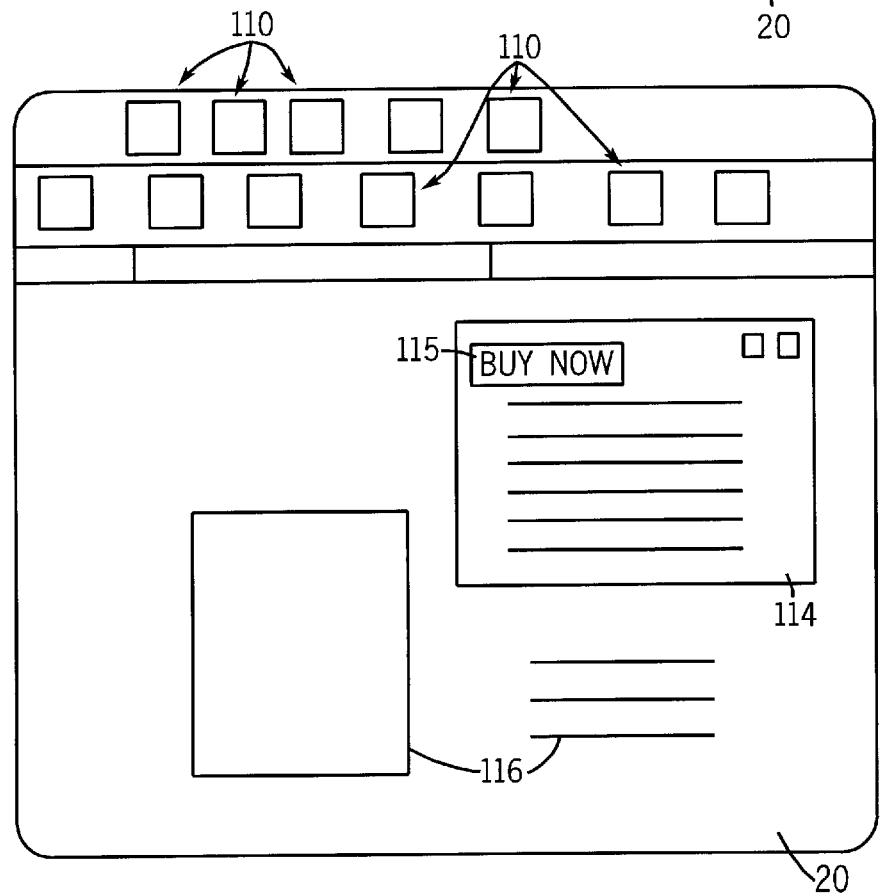
FIG. 7 is a diagram similar to that of FIG. 6, but showing the present systems capability for retrieving information related to the current FM radio broadcast while utilizing or obtaining other information, such as that available over the Internet.

Referring generally to FIGS. 6 and 7, exemplary display screens are illustrated. Although a variety of graphical user interfaces may be utilized, a typical personal computer interface utilizes a Windows-style screen having a plurality of prompts 110 that allow the user a "point and click" format to interface with the personal computer. For example, as is commonly known, a mouse can be used to move a cursor and click on the various indicators or prompts. Similarly, an exemplary embodiment of the present invention utilizes a prompt 112 that is visible on display screen 20 when RDS/MBS signals are being received via radio data reception system 28.

The application software permits a user to simply point and click on prompt 112 to obtain access to the information stored in memory location M and related to the primary programming broadcast by radio station 34. When an individual points and clicks on prompt 112, a desired stored information 114 is displayed on screen 20, as illustrated in FIG. 7. Preferably, the data trigger carried by the RDS/MBS signal also contains address/file/desired information, e.g. CDDB identifiers, related to specific subject matter of the primary FM broadcast being received at that specific time. Thus, when the individual clicks on prompt 112, he or she is provided with information 114 that is specifically related to the then current programming. As mentioned, the listener may have established accounts with Internet CD vendors or advertisers so that by clicking on a box 115 labeled, for example, "Buy now" on their personal computer monitor, an order will be placed for the song or advertised item as it is heard using unique identification numbers assigned to products, services or music selections and broadcast over the RDS or MBS system.

Also, the storage of information related to the FM radio broadcast at storage location M permits a user to obtain information about the radio broadcast programming without interrupting other applications 116 being used on computer system 12. For example, the user may be sending or retrieving information over the Internet (network 100) while retrieving information related to a specific song or other programming without interrupting his or her utilization of the network. Potentially, this provides the user an efficient method for ordering information or products over the Internet that are related to the music, advertisements or other material being broadcast by FM radio station 34. This ability can be tremendously helpful for both the radio station and advertisers alike.

It will be understood that the foregoing description is of preferred exemplary embodiments of this invention, and that the invention is not limited to the specific forms shown. For example, a variety of radio wave receiver systems, computer systems and data triggers may be utilized; the form and arrangement of computing systems and entertainment systems may change while still incorporating the present invention; the circuitry and electrical components can be adjusted according to specific applications; and the information related to the FM broadcast can be stored in a variety of locations, including a networked location, although it is preferred that the information be stored in a location that does not require the interruption of network usage. These and other modifications may be made in the design and arrangement of the elements without departing from the scope of the invention as expressed in the appended claims.

What is claimed is:

1. A radio reception system, comprising:

an interactive computer based system that may be coupled to the Internet for the transfer and receipt of information over the Internet;

a radio receiver operatively coupled to the interactive computer based system, the radio receiver being capable of receiving a data trigger related to programming broadcast by a radio station; and a data storage location accessible to the interactive computer based system, wherein the data trigger provides a user direct access to information stored at the data storage location related to the radio broadcast programming, wherein the data storage location is on a hard drive of the interactive computer based system.

2. The radio reception system as recited in claim 1, wherein the radio receiver is configured to receive a broadcast FM signal.

3. The radio reception system as recited in claim 1, wherein the radio receiver is mounted on a printed circuit board configured to be plugged into the interactive computer based system.

4. The radio reception system as recited in claim 1, wherein the data trigger comprises a unique identification code to allow a listener to initiate a commercial transaction over a network as it is being described on an audible FM broadcast.

5. A radio reception system, comprising:

an interactive computer based system that may be coupled to the Internet for the transfer and receipt of information over the Internet;

a radio receiver operatively coupled to the interactive computer based system, the radio receiver being capable of receiving a data trigger related to programming broadcast by a radio station; and a data storage location accessible to the interactive computer based system, wherein the data trigger provides a user direct access to information stored at the data storage location related to the radio broadcast programming, wherein the data storage location is on a removable storage device.

6. The radio reception system as recited in claim 5, wherein the removable storage device comprises a compact disc.

7. The radio reception system as recited in claim 5, wherein the removable storage device comprises a floppy disk.

* * * * *